(12) United States Patent
Nishiyama et al.

(10) Patent No.: US 6,573,006 B2
(45) Date of Patent: Jun. 3, 2003

(54) NON-SINTERED TYPE POSITIVE ELECTRODE FOR ALKALINE STORAGE BATTERY AND ALKALINE STORAGE BATTERY

(75) Inventors: Hiroshi Nishiyama, Moriguchi (JP); Hidekatsu Izumi, Neyagawa (JP); Hiroyuki Sakamoto, Katano (JP); Yoichi Izumi, Moriguchi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 164 days.

(21) Appl. No.: 09/801,002

(22) Filed: Mar. 8, 2001

(65) Prior Publication Data

US 2001/0033968 A1 Oct. 25, 2001

(30) Foreign Application Priority Data

Mar. 21, 2000 (JP) ........................................ 2000-077607

(51) Int. Cl.[7] .......................... H01M 4/32; H01M 4/52; H01M 4/62
(52) U.S. Cl. ...................... 429/223; 429/232; 252/182.1
(58) Field of Search .............................. 429/223, 218.1, 429/231.5, 232, 206; 252/182.1

(56) References Cited

U.S. PATENT DOCUMENTS 6,040,087 A * 3/2000 Kawakami ............... 429/218.1

FOREIGN PATENT DOCUMENTS

| JP | 63266770 | 11/1988 |
|----|----------|---------|
| JP | 63301461 | 12/1988 |
| JP | 378965 | 4/1991 |
| JP | 6187984 | 7/1994 |
| JP | 9115521 | 5/1997 |
| WO | 9967839 | 12/1999 |
| WO | 0010212 | 2/2000 |

OTHER PUBLICATIONS

European Search Report dated Jun. 17, 2002.
Patent Abstracts of Japan, vol. 1997, 03, Mar. 31, 1997 & JP08 298121 A (Fuji Photo Film Co., LTD), Nov. 12, 1996, English abstract.
Patent Abstracts of Japan, vol. 1998, No. 10, Aug. 31, 1998 & JP10 134815 A (Tokuyama Corp), May 22, 1998, English abstract.
Patent Abstracts of Japan, vol. 015, No. 394 (E–1119), Oct. 7, 1991 & JP03 159064 A (Matsushita Electric Ind. Co., LTD.), Jul. 9, 1991, English abstract.
Oshitani, Masahiko et al. "The Study on the Pasted Nickel Electrode." Yuasa–Jiho, No. 65, Oct. 1998, pp. 28–40.

* cited by examiner

Primary Examiner—Stephen Kalafut
Assistant Examiner—Raymond Alejandro
(74) Attorney, Agent, or Firm—Stevens, Davis, Miller & Mosher, LLP (57) ABSTRACT

A metal nitride is added as the conductivity-imparting component to a positive electrode for alkaline storage battery, which contains the active material comprising nickel hydroxide as the main component to provide alkaline storage batteries having the good cycle characteristics.

19 Claims, 5 Drawing Sheets

NON-SINTERED TYPE POSITIVE ELECTRODE FOR ALKALINE STORAGE BATTERY AND ALKALINE STORAGE BATTERY

BACKGROUND OF THE INVENTION

1. Field of the Invention

The present invention relates to an improvement of the performance of positive electrodes intended for use in alkaline storage batteries such as nickel-cadmium storage battery and nickel-metal hydride storage battery.

2. Description of Related Art

Portable and cordless electronic appliances have been quickly prevailing in recent years. Accordingly, there have been great demands for small-sized, lightweight and high capacity secondary batteries, capable of repeated uses as the driving power source.

The nickel-cadmium storage batteries have a high energy density per unit weight or volume and are excellent in reliability such as cycle life. Therefore, they have found the application in various portable appliances as the power source to date. Conventionally, these nickel-cadmium storage batteries have used the sintered type nickel positive electrodes, but with the advent of non-sintered type nickel positive electrodes likely to materialize a capacity higher than them. Furthermore, nickel-metal hydride storage batteries using a hydrogen-absorbing alloy in the negative electrode and so forth have been developed as well.

In the non-sintered type positive electrodes, however, nickel hydroxide used for the active materials is low in the conductivity, and thus if the positive electrodes are made by using nickel hydroxide singly, the active material near the core material can participate in reactions but not the active material distant therefrom. The weakness has given rise to a problem that the batteries having a high capacity are unfeasible with the non-sintered type positive electrodes. For this, it is necessary to add a conductive material to the positive electrodes, and the Yuasa Journal (No. 65, 28 (1988)) and so forth have proposed the methods for adding the cobalt compounds such as metal cobalt powder and cobalt oxide powder as said conductive material.

The nickel positive electrode is filled with a nickel hydroxide and a conductive material such as cobalt metal, cobalt oxide or cobalt hydroxide and incorporated into an alkaline storage battery, wherein the cobalt compound is dissolved into the electrolyte as the cobalt acid ions and uniformly dispersed on the surfaces of nickel hydroxide. Then, upon initial charge, the dispersed cobalt compound is electrochemically oxidized into cobalt oxyhydroxide, forming a conductive network connecting one active material with another or the active materials with the porous substrate and producing an effect of improving the active material utilization. On the other hand, it has been reported in JPA 3-78965 and so forth that, by using nickel hydroxide coated with cobalt oxyhydroxide or cobalt hydroxide for an active material, cobalt oxyhydroxide which is a conductive material is physically arranged on the surfaces of the nickel hydroxide particles strongly and uniformly, resulting in the battery characteristics more stable than if cobalt hydroxide in the shape of particles are singly used as the conductive material.

Today when there are great demands for low priced batteries in the market, however, it is not preferable to use those cobalt compounds as the conductive material. The cobalt compounds such as metal cobalt powder and cobalt oxide powder are expensive as the material, and as a result, their use leads to the high price of batteries. Furthermore, there is another problem that the processing cost of coating cobalt on the nickel hydroxide active material is high as compared with the cost of merely adding cobalt thereto In order to find a solution in these problems, it has been proposed in JPA 63-301461, JPA 63-266770 and so forth that metal nickel, carbon powder and so forth which are cheaper than the cobalt compounds should be contained in the positive electrodes as the conductive material or coated on the nickel hydroxide active material to impart the conductivity. Especially, carbon powder as a material is likely to reduce the manufacturing cost to a very low level, even as compared with metal nickel. Graphite powder and so forth has also been tried, for example, by coating the surfaces of graphite with aluminum oxide to improve the cycle characteristics (for example, JPA 9-115521) or attempting to introduce various other improvements.

BRIEF SUMMARY OF THE INVENTION

Metal nickel has been found to have a problem, however, that parts of the compound are electrochemically oxidized into nickel hydroxide in the alkaline electrolyte on account of charging, resulting in the lower conductivity and thus the deterioration of the cycle characteristics.

On the other hand, carbon powder has a great bulk, and if it is used for the conductive material, it reduces the amount of positive electrode active material that can be filled into a given volume, giving rise to the deterioration of the battery capacity. Carbon powder has another problem that it forms the carbonic acid ions on account of oxygen gas generated upon overcharging and produces certain compounds in association with the hydrogen-storing alloy of the negative electrode. Thus, the capacity of the negative electrode is decreased to deteriorate the cycle life. Furthermore, even if aluminum oxide is coated on the surfaces of carbon to inhibit the oxidization, the inhibition is not good enough as evidenced by the resultant utilization short of 60% after 500 cycles.

The present invention is intended to overcome the problems of metal nickel and carbon powder as described above, and an object of the present invention is to provide a non-sintered type positive electrode for alkaline storage battery having the good cycle characteristics by using a metal nitride having a high conductivity and stable presence in an alkaline electrolyte for a long term as the conductivity imparting component of the positive electrode for alkaline storage battery.

Said object can be achieved by using a metal nitride as the conductivity imparting component in the positive electrodes for alkaline storage battery containing the active material comprising nickel hydroxide as the main component.

There can be enumerated three ways of how said metal nitrides are contained in the positive electrodes, for example: a metal nitride conductive material is mixed with the active material comprising nickel hydroxide as the main component; nickel hydroxide powder is coated with a metal nitride; and nickel hydroxide power is coated with a metal nitride to make the main active material, mixed with the metal nitride particles as the conductive material.

The metal nitrides are represented by such a substance as titanium nitride (TiN), zirconium nitride (ZrN) and so forth. These metal nitrides are very high in conductivity but also in chemical stability.

These and other objects and advantages of the present invention will be readily apparent from the following description of the Invention.

DETAILED DESCRIPTION OF THE INVENTION

According to the present invention, a metal nitride is added to a non-sintered type positive electrode for alkaline storage battery as the conductivity imparting component. The positive electrodes obtained can exhibit the good cycle characteristics for a long term and maintain the utilization at 60% of the initial value even after 550 cycles are exceeded.

Said metal nitrides are preferably at least one selected from the group consisting of transition metal nitride, alkaline metal nitride and alkaline earth metal nitride, more preferably at least one selected from the group consisting of TiN, ZrN, HfN, VN and NbN. TiN, ZrN, HfN, VN and NbN show high conductivity among metal nitrides. The metal nitrides are not limited to only one kind but two kinds or more of metal nitrides may as well be used. The representative metal nitrides are TiN and ZrN. They are the substances having a very high conductivity and a very high chemical stability.

While TiN and so forth are good for use even at 1000° C. in the atmosphere, they are golden and have been used for the purpose of decorating watches and so forth as substitute gold. On the other hand, ZrN are a covalently bonded material having a high melting point, characterized by high hardness and gloss. Furthermore, they are a solar heat absorbing material operable at high temperatures and have also been used as an optical screening film.

Since the metal nitrides represented by these TiN and ZrN are high in conductivity, they are added into the positive electrodes in order to raise the conductivity throughout a positive electrode and improve the utilization. Furthermore, the metal nitrides are very stable in the alkaline electrolyte and are also stable to the oxidization and reduction accompanying the charge-discharge of the batteries. The metal nitrides are practically free from the oxidization or reduction even when the electric voltage of the positive electrodes falls to −0.9V (in terms of Hg/HgO electrode voltage) at a level of the voltage of the negative electrodes.

The metal nitrides preferably have a conductivity of $1.0 \times 1$ DS/cm or more at room temperature.

The metal nitrides are, for example, contained into the positive electrodes in the following ways:

(1) The metal nitrides are added as the conductive material. In this case, the metal nitrides are preferably in the shape of particles, having an average particle diameter of 10 $\mu$m or less. The metal nitrides are added preferably in an amount of 5 to 20% by weight to the positive electrode active material comprising nickel hydroxide as the main component. The metal nitrides form a good conductive network surrounding nickel hydroxide, main component of the active material, improving the conductivity from one active material to another. In this way, the good cycle characteristics capable of continuing for a long term can be obtained in a state of holding the utilization of the active material at a high level.

(2) The metal nitride-containing conductive layers are formed on at least parts of the surfaces of nickel hydroxide particles that are the main component of the active material. Since the metal nitride conductive layers are coated on the surfaces of the nickel hydroxide particles, few contacts are made between one nickel hydroxide with low conductivity and another and a great deal of contacts are made between one conductive layer and another, inducing little contact resistance. Furthermore, the conductive layers are strongly connected with the nickel hydroxide particles, preventing the composite particles from the easy decomposition in the charge-discharge cycle and permitting them to continue exhibiting the good cycle characteristics for a long term.

Furthermore, it is possible to provide the high capacity positive electrodes by coating the surfaces of the nickel hydroxide particles with the conductive layers comprising the metal nitrides represented by TiN and ZrN. Said metal nitrides are very stable in the alkaline solutions but also are stable even to the oxidization and reduction accompanying the charge-discharge of batteries, providing the alkaline storage batteries excellent in the cycle characteristics capable of maintaining the high utilization for a long term. The conductive layers are coated preferably in an amount of 5 to 20% by weight to the particles.

(3) The composite particles coating the conductive layers comprising a metal nitride on at least parts of the surfaces of the nickel hydroxide particles are used as the positive electrode active material, further mixed with another metal nitride as the conductive material.

The composite particles coating the surfaces of the nickel hydroxide particles with the conductive layers comprising the metal nitride can efficiently form a conductive network. The utilization can further be improved by reducing the coating amount of the metal nitride and mixing the metal nitride saved by reducing as the conductive material. In this case, the coating amount of the metal nitride is preferably greater than the mixing amount of the metal nitride for the conductive material, namely 50% by weight or more.

It is thought that, in the structure described as above, the electrons can smoothly migrate from the metal nitrides mixed as the conductive material to the composite particles coated with the conductive layers on their surfaces, having little contact resistance and enabling the utilization to rise high as a result. In the charge-discharge cycle as well, the composite particles do not decompose easily, continuing to exhibit the good cycle characteristics for a long term. The metal nitrides are preferably used in a total amount of 5 to 20% by weight to the positive electrode active material, and the conductive material is preferably in the shape of particles, having an average particle diameter of 10 $\mu$m or less.

The present invention may also be a sub-combination of these described features.

EXAMPLES

The present invention will be explained in detail below with reference to the examples but it should be noted that the present invention is not limited in any way to these examples and that any modifications can be made unless they deviate from the essentials of the present invention defined herein.

Example 1

At first, a zirconium nitride (ZrN, Density of 7.09 g/cc) was selected as the metal nitride to serve as the conductive material. It was found that this ZrN particles had an average particle diameter of 1 μm. Two grams of this ZrN powder were pressed into pellets under pressure of 400 kg f/cm$^2$ and the powder conductivity was calculated from the current value that was obtained by applying a direct current voltage to said pellets, with the resultant finding of $1.0 \times 10^2$ S/cm. Furthermore, this ZrN powder was immersed in a 7.2N KOH solution for a week and then stirred and the supernatant liquid thereof was analyzed according to the IPC emission analysis, and as a result it was found that practically no zirconium was detected, proving that ZrN powder had very stable presence in the alkaline solutions.

This ZrN powder was made into paste, the electrodes were made therefrom and their voltage was scanned in a range of −0.4 to 0.6 V in a Hg/HgO electrode, with a finding that no oxidization-reduction peaks were observed. The range of voltage corresponds to the voltage of 0.5 to 1.5V in a battery wherein a hydrogen-absorbing alloy is used in the negative electrode, accounting for the voltage variation in the charge-discharge of a nickel-metal hydride storage battery. Therefore, it was evident that ZrN powder added to the positive electrodes as the conductive material would have stable presence in said voltage variation.

Figure 1:
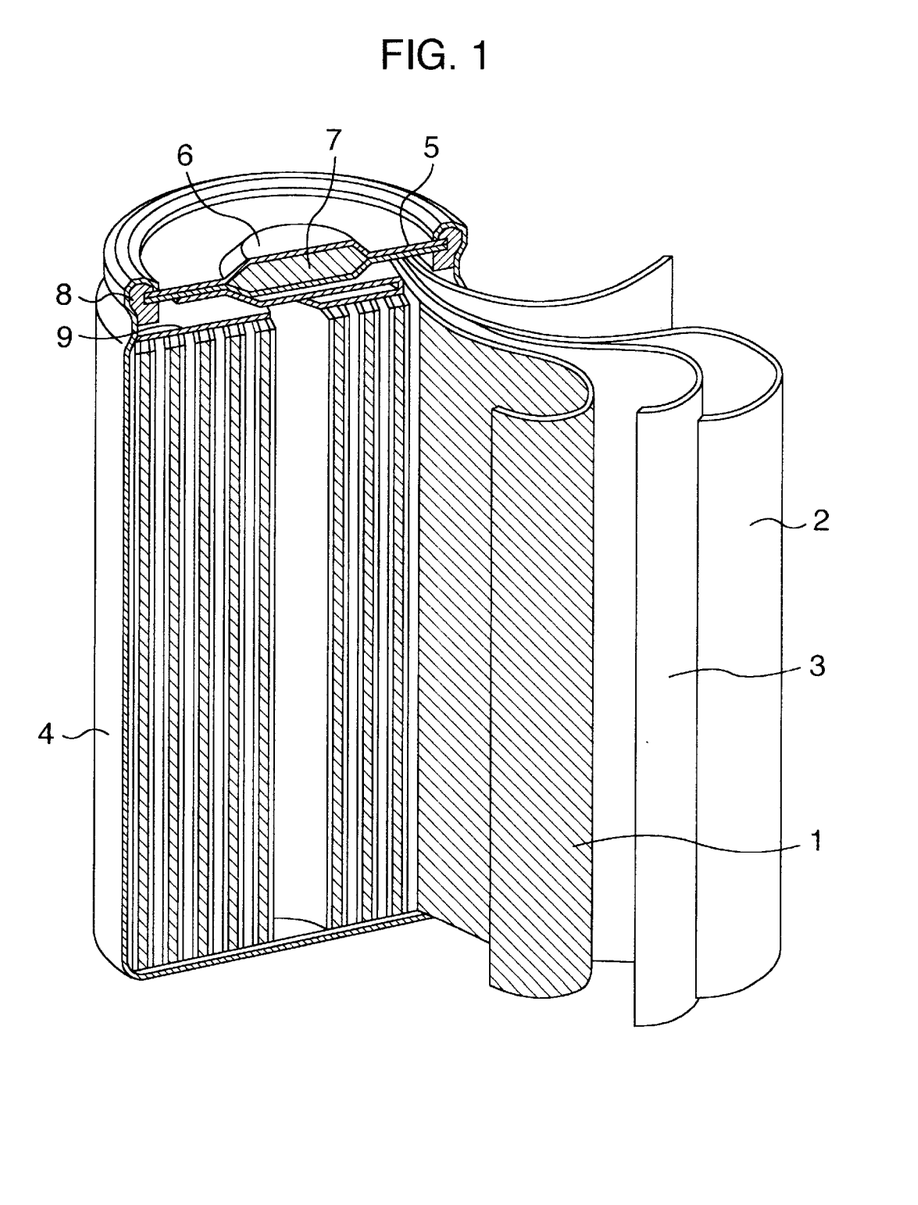
FIG. 1 is a transverse, sectional schematic view of a nickel-metal hydride storage battery.

Referring to FIG. 1, the batteries were made by the use of ZrN powder having said characteristics as the conductive material. The use of carbon (graphite) and metal nickel powder as the conductive material also made the control batteries. Scaly graphite powder having an average particle diameter of 20 μm was obtained from the market and tetracarbonylnickel was pyrolyzed into metal nickel powder (average particle diameter of 0.7 to 5 μm) for use herein.

Figure 2:
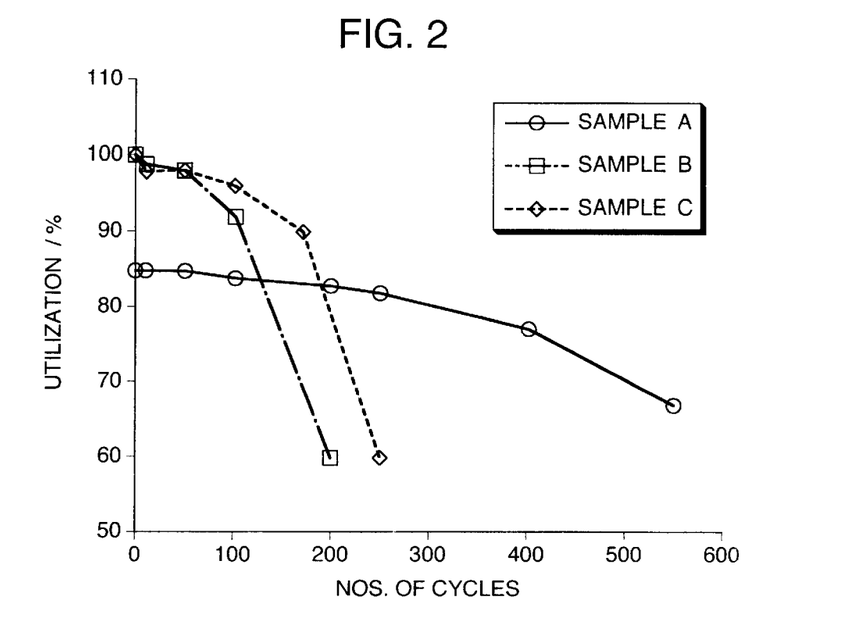
FIG. 2 is a diagram showing the relationship between the utilization and the number of cycles in Example 1.

The ZrN, graphite and metal nickel conductive materials were added respectively in an mount of 20% by weight to 100 parts by weight of the nickel hydroxide active material, mixed and stirred well, made into paste by the addition of water and filled into expanded nickel sheets (95% porosity; 0.1 mm thick). The so obtained nickel sheets were dried at 80° C., pressed on a roller press to have a thickness of 0.7 to 0.8 mm and coated on the surfaces with fluoroplastic powder to provide the electrodes. These electrodes were cut into 39 mm wide and 75 mm long pieces and a leading wire was set to each piece at the predetermined position to provide a positive electrode plate 1 having a capacity of approximately 1100 mAh. A negative electrode was prepared by applying a hydrogen-absorbing alloy to a punching metal and molding them into a 39 mm wide, 101 mm long and 0.35 to 0.4 mm thick negative electrode plate 2 having a capacity of approximately 2100 mAh. A positive electrode plate 1 and a negative electrode plate 2 were combined with a separator 3 comprising a polypropylene unwoven fabric imparted with hyrophilicity in the shape of a spiral and packed into an AA size cylindrical metal case 4. Approximately 2.5 ml of a potassium hydroxide aqueous solution (31% by weight, 40 g/l of LiOH.H$_2$O added thereto) was injected into the metal case 4 to provide a sealed type nickel-metal hydride storage battery having a capacity of 1100 mAh. FIG. 1 is a transverse, sectional schematic view of this battery. These nickel-metal hydride storage batteries were evaluated to compare their utilization by charging them with a current of 0.1C (10 hour rate, for example a current of 110 mAh in a 1100 mAh battery) for 15 hours and thereafter discharging them with a current of 0.2 C until the battery voltage reduced to 1.0 V. The term utilization means a ration of discharge capacity against the theoretical capacity of the battery. FIG. 2 is a diagram showing the relationship between the utilization of the active material and the number of cycles. Herein, Sample A represents the batteries using ZrN, Sample B those using graphite and Sample C those using metal nickel as the conductive material. Samples B and C using graphite and metal nickel as the conductive material were found to have an initial utilization as high as almost 100% but the utilization fell to less than 60% of the initial value after 250 cycles in the case of metal nickel and after scanty 200 cycles in the case of graphite.

On the contrary, Sample A by the use of ZrN as the conductive material was found to have the initial utilization at 85% that was poor as compared with those of Samples B and C but its utilization could stay at 65% or higher even after 550 cycles were exceeded, achieving a big improvement of the cycle characteristics. Thus, it was established that the use of ZrN as the conductive material is a significant means for modifying the cycle life characteristics.

Example 2

An investigation in an attempt to determine whether or not the metal nitrides other than ZrN could improve the cycle life characteristics as efficiently as described in Example 1 was conducted by preparing and analyzing batteries by mixing various metal nitrides as the conductive material with nickel hydroxide. The investigation included 5 metal nitrides of titanium nitride (TiN), niobium nitride (NaN), hafnium nitride (HfN), vanadium nitride (VN) and aluminum nitride (AlN), and all these metal nitrides except for AlN were found to have respectively a conductivity of $1.0 \times 10$ S/cm or more, while AlN, an insulating material, was found to have a conductivity in order of $1.0 \times 10^{-13}$. Furthermore, the nitrides were treated with an alkali as in Example 1, and the resultant supernatant liquid was examined by the IPC emission analysis, with practically no finding of each metal element and proving that the metal nitrides had stable presence in the alkaline solutions. Furthermore, the voltage was scanned in the electrodes comprising these metal nitrides by following the procedures of Example 1, and as a result it was found that no peaks of oxidization-reduction were observed, establishing that the presence of these metal nitrides was stable even to the voltage. These 5 metal nitrides were mixed respectively in an amount of 20% by weight to 100 parts by weight of nickel hydroxide to prepare the batteries and the so obtained batteries were analyzed in the same way as in Example 1. Hereinafter, the batteries were prepared and tested by following the procedures of Example 1 unless otherwise specified.

Figure 3:
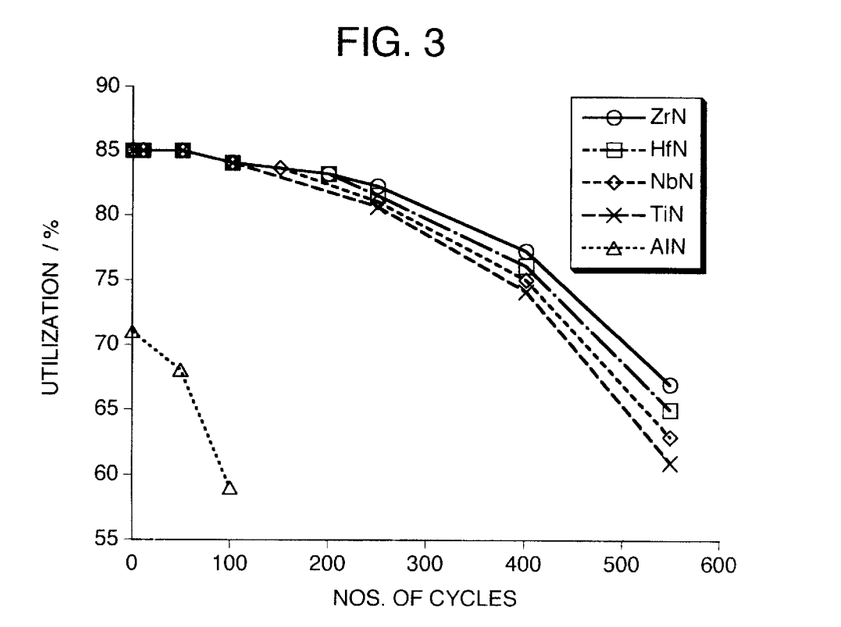
FIG. 3 is a diagram showing the relationship between the utilization and the number of cycles in Example 2.

FIG. 3 is a diagram showing the results of the cycle life characteristics test. In the case of using 4 metal nitrides of TiN, NbN, HiN and VN, the utilization was found to be 62% or higher after 550 cycles, evidencing as good cycle life characteristics as in Example 1 wherein the zirconium nitride was used and suggesting that these compounds were good enough to perform as the conductive material. However, AlN, an insulating material, was found to have an initial utilization of 71% and a cycle life of 100 cycles (the utilization of less than 60%), poorer than the values obtained with the other nitrides. It is thought that this was because the AlN was too low in the conductivity to form the effective conductive network between one nickel hydroxide active material and another. Therefore, the metal nitrides intended for use as the conductive material should preferably have a conductivity of 1.0×10 S/cm or more.

Example 3

Figure 4:
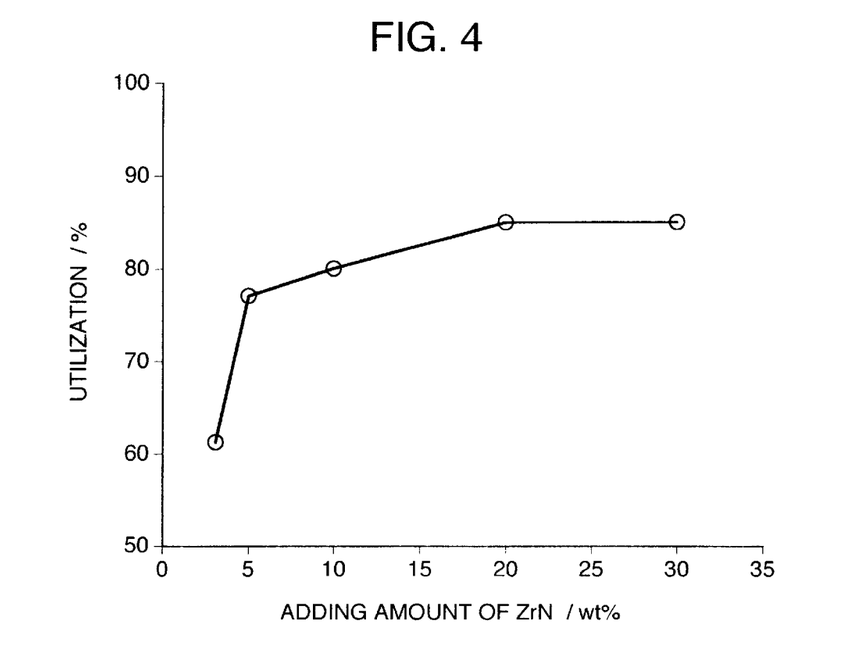
FIG. 4 is a diagram showing the relationship between the adding amounts of the conductive material and the utilization in Example 3.

An investigation was conducted in an attempt to determine how much conductive material is needed in proportion to nickel hydroxide. Zirconium nitride powder (average particle diameter of 1 μm) was used as the conductive material and added in different amounts of 3, 5, 10, 20 and 30% by weight to 100 parts by weight of the nickel hydroxide active material, and the batteries were prepared and evaluated by following the procedures of Example 1. FIG. 4 is a diagram showing the relationship between the utilization (calculated in terms of the capacity at the 10th cycle) and the various mixing ratios of ZrN with nickel hydroxide.

As shown in FIG. 4, the amount of ZrN mixed with 100 parts by weigh of nickel hydroxide was found to give rise to a high utilization of 77% at 5% by weight; that of 80% at 10% by weight and that of 85% at 20% by weight. As a result, it was suggested that ZrN could satisfactorily achieve the performance of a conductive material even in an amount of 20% by weight or less to the positive electrode active material. At 3% by weight, however, the utilization reached a low of 61% and no more, clearly showing that ZrN in this amount was short as the conductive material. When ZrN was mixed in an amount of 30% by weight, the utilization climbed up to 85% but practically was not different from that of mixing in the amount of 20% by weight, and further it is undesirable to increase ZrN that much and relatively decrease the active material itself with the result that the battery capacity is deteriorated. Therefore, it is preferable that ZrN should be mixed as the conductive material in an amount of 5 to 20% by weight to the active material comprising nickel hydroxide as the main component.

Example 4

Figure 5:
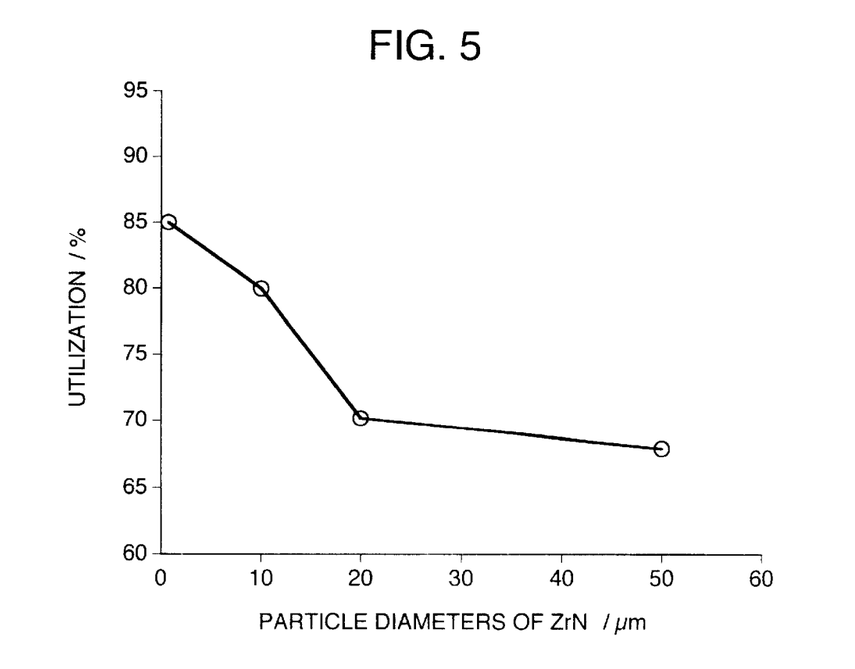
FIG. 5 is a diagram showing the relationship between the average particle diameters and the utilization in Example 4.

ZrN having an average particle diameter of 1 μm had been used in Examples 1 and 3, and an investigation to determine the effect by the particle diameter on ZrN as the conductive material was conducted by preparing the batteries by the use of ZrN powder having various particle diameters and evaluating them with the determination of the utilization after 10 cycles. ZrN powder had 4 different average particle diameters of 50 μm, 20 μm, 10 μm and 1 μm for use herein and was added in the same amount of 20% by weight as in Examples 1 and 3. FIG. 5 is a diagram showing the utilization after 10 cycles by the use of each ZrN powder. As shown therein, the utilization was found to rise in descending order of the particle diameters, and while the utilization was the highest at 85% by the use of ZrN powder having an average particle diameter of 1 μm as the conductive material, the use of ZrN having an average particle diameter of 10 μm achieved the utilization of 80%. The utilization significantly fell to 70% with the average particle diameter of 20 μm and to 68% with that of 50 μm, and it is evident that ZrN should desirably have an average particle diameter of 10 μm or less to serve as the conductive material.

Example 5

In the present invention, the composite particles arranging the metal nitride conductive layers on at least parts of the surfaces of nickel hydroxide were synthesized by the use of a mechanochemical reaction (mechanofusion method) on a compression grinding type grinder according to the proposal described in JPA 6-187984 and so forth. Coating was given in different amounts of 3, 5, 10, 20 and 30% by weight to the active material in the same way as in Example 3. ZrN had an average particle diameter of 1 μm for use herein.

The composite particles obtained as a result of said treatment had been green prior to the treatment but then changed their color to light green because their surfaces were coated with very fine ZrN.

Next, the alkaline storage batteries were prepared and evaluated by using the so obtained composite particles as the positive electrode active material. The batteries were prepared and tested by following the procedures of Example 1.

Figure 6:
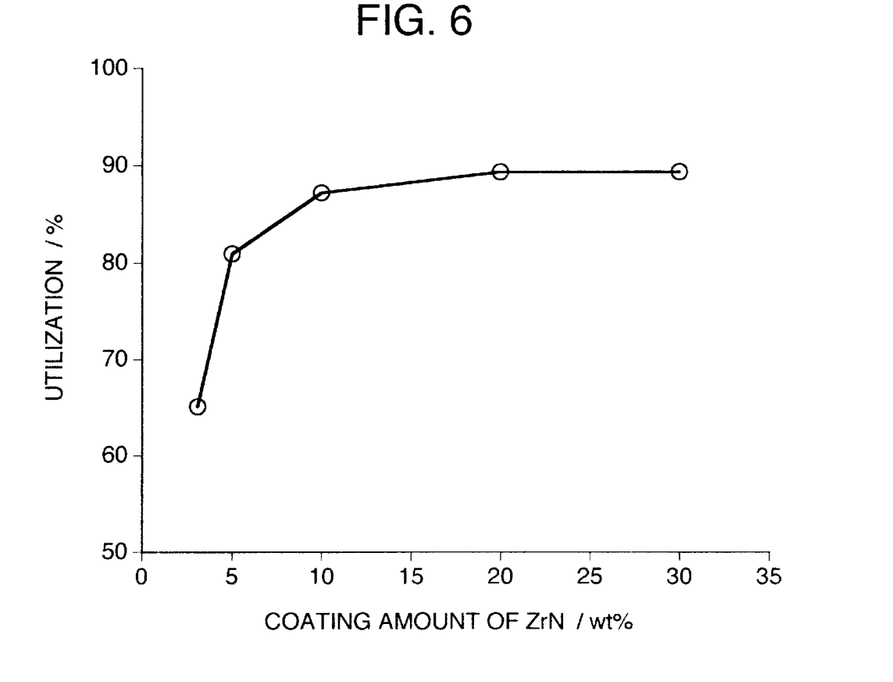
FIG. 6 is a diagram showing the relationship between the coating amounts of the conductive layers over the active material and the utilization in Example 4.

FIG. 6 is a diagram showing the relationship between the coating amount of ZrN in the active material and the utilization. The utilization was calculated from the capacity at the 10th cycle. When the composite particles having the coating amount of 5% by weight were used in the positive electrodes, the utilization was 81%, representing a better utilization than in Example 4 wherein the same amount of ZrN was added as the conductive material. It is conceivable that coating permits the efficient formation of the highly conductive network between one active material and another, helping the active materials to achieve the utilization better than in the case of mere mixing. With the coating amount of 20% by weight, the utilization climbed up to 89%, a value very close to 90%. Moreover, in the same manner as in the results of Example 3, the utilization was low with the coating amount of 3% by weight to the active materials and with 30% by weight was little different from that of coating in the amount of 20% by weight and there is a likelihood that it is no good arranging more than 20% by weight of conductive layers in the active materials. Therefore, it is preferable to give coating in an amount of 5 to 20% by weight.

Example 6

Coating the surfaces of the active materials with the metal nitride as described in Example 5 is a useful means for raising the utilization with a given mixing amount. However, coating costs time and it is desirable to give coating in as small an amount as possible. Therefore, an investigation was conducted in an attempt to develop a method for achieving the utilization as it should be by reducing the coating amount and mixing the remainder as the conductive material.

The composite particles having coating with the metal nitride were prepared by following the procedure of Example 5 and another metal nitride was mixed as the conductive material into the so obtained composite particles. Table 1 shows the ratio between the coating amount and the mixing amount. Furthermore, the coating amount, plus the mixing amount of metal nitride as the conductive material, accounted for a total of 20% by weight to nickel hydroxide powder, and ZrN had an average particle diameter of 1 μm for use as metal nitride herein.

TABLE 1

| | ZrN Amount to 100 Wt. Parts of Active Material (Ni(OH)$_2$) | | |
|---|---|---|---|
| | Coating Amount (Conductive Layer Content) | Mixing Amount | Total Amount |
| Positive Electrode D | 8 | 12 | 20 |
| Positive Electrode E | 10 | 10 | 20 |
| Positive | 12 | 8 | 20 |

TABLE 1-continued

ZrN Amount to 100 Wt. Parts of Active Material (Ni(OH)$_2$)

| | Coating Amount (Conductive Layer Content) | Mixing Amount | Total Amount |
|---|---|---|---|
| Electrode F Positive | 16 | 4 | 20 |
| Electrode G Positive | 0 | 20 | 20 |
| Electrode H Positive | 20 | 0 | 20 |
| Electrode I | | | |

The alkaline storage batteries were prepared and evaluated by using Positive Electrodes D to I listed in Table 1, and their utilization was calculated and compared with the results obtained in Examples 3 and 5. The batteries were prepared and tested by following the same procedures as described heretofore.

Figure 7:
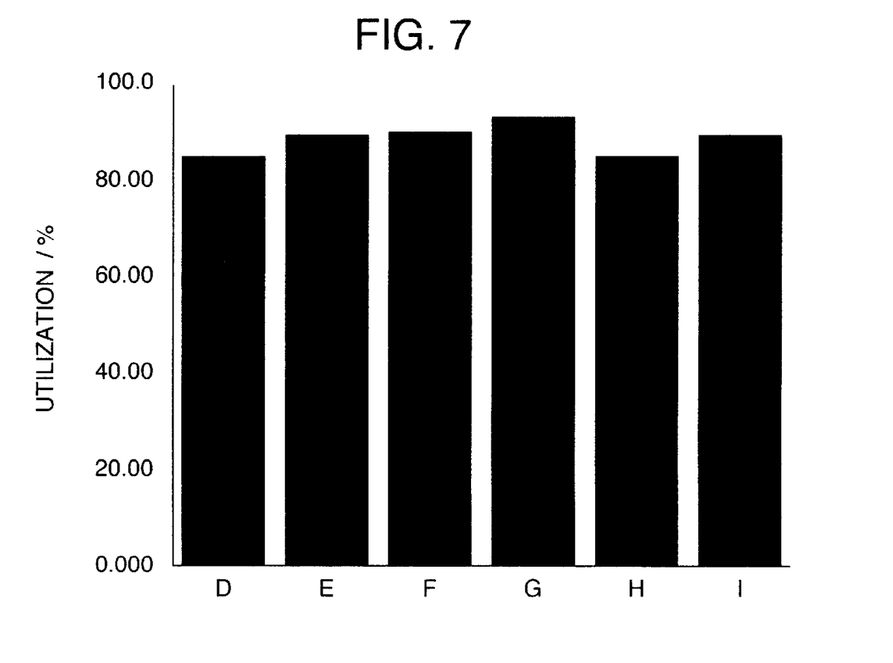
FIG. 7 is a diagram showing the relationship of each sample with the utilization in Example 6.

FIG. 7 is a bar graph showing the results of determining the utilization after 10 cycles of the batteries prepared as above. With Positive Electrode D having the 40% coating amount (60% mixing amount as the conductive material), the utilization was found to be 85%. This value was almost equivalent to that of Positive Electrode H entirely free from coating and given mixing alone, further, this value was conversely lower than that of Positive Electrode I having the entirely coated composite particles. Therefore, it was clear that the effect by coating could not be observed with the 40% coating. With Positive Electrode E allocating 50% to coating and remaining 50% to adding, however, the utilization rose to 89%, almost as good as that of Positive Electrode I, namely having the 100% coated composite particles. This makes it possible to reduce the coating amount by half but to be able to achieve the equal utilization, and it seems likely that this ratio will make an effective tool in terms of time and process. Furthermore, with Positive Electrode G having 80% coating and remaining 20% adding, the utilization soared up to a high of 93%. The utilization was different in many ways though the metal nitride was always added in the same amount, and it seems likely that this difference can be explained by the difference of the conductive network in nickel hydroxide. In the present Example, the best method for building those conductive networks was the method for preparing Positive Electrode G by 80% coating and 20% extraneous adding of the metal nitride (the total amount of metal nitride is 20% by weight in proportion to nickel hydroxide). It was also evident that the utilization would by no means fall unless the coating amount is reduced to less than 50%.

Figure 8:
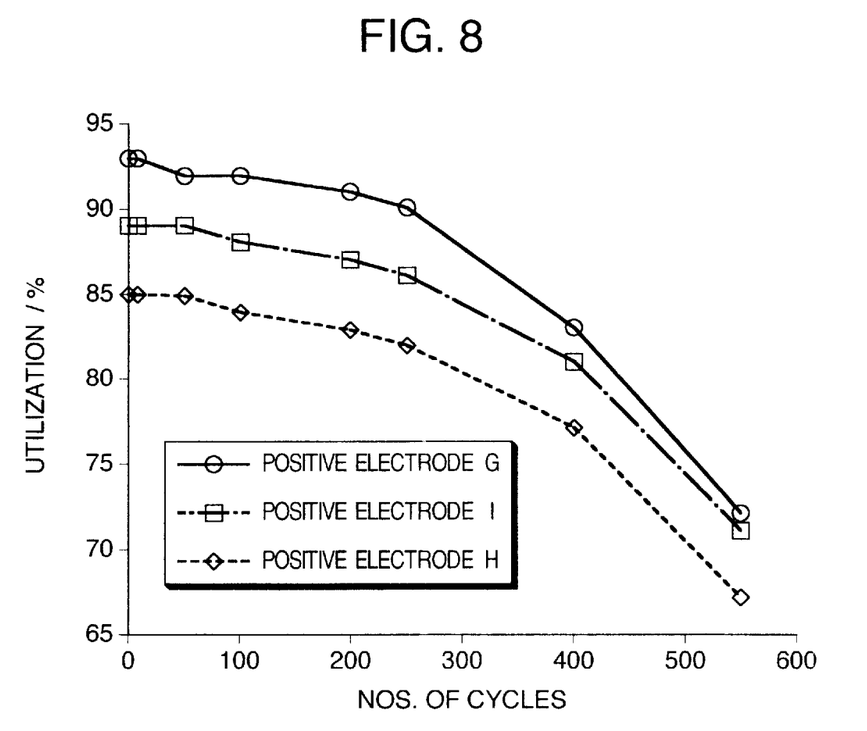
FIG. 8 is a diagram showing the relationship between the utilization and the number of cycles in Example 6.

FIG. 8 is a diagram showing the cycle characteristics of Positive Electrodes G, H and I. Positive Electrode H had been described in Example 1 as above, but it was found that the utilization of Positive Electrode H achieved a very high value of 67% and that of Positive Electrodes G and I rose even higher to more than 70% at the time when 550 cycles were exceeded. These facts brought it to light that coating the active material with the metal nitride (or along with mixing) was a significant means for modifying the cycle life characteristics.

Although ZrN was chiefly used as metal nitride powder in the Examples described as above, the metal nitride such as TiN, NbN, VN and HfN will be capable of providing almost as good an effect as in the Examples. Furthermore, the similarly good effect can be obtained by the use of transition metal nitride, alkaline metal nitride and alkaline earth metal nitride.

In whichever way these conductive materials may be incorporated into the active material, mixing or coating on parts of the surfaces of the active material or both ways, the metal nitrides are not limited to only one kind and a plurality of conductive materials comprising any combinations of metal nitrides enumerated hereinabove can be used.

Although the present Examples had provided the descriptions about powder of the positive electrode active material comprising nickel hydroxide, solid solution powder comprising nickel hydroxide as the main component and containing foreign metal elements such as cobalt, zinc, cadmium and manganese will be able to produce an effect almost as good as in the Examples. Furthermore, almost as good an effect can be obtained by the use of nickel hydroxide wherein the hydroxides of nickel are partially oxidized by nickel oxyhydroxide.

Although the present Examples had provided the descriptions about the batteries wherein the positive electrode is a nickel electrode and the negative electrode comprises a hydrogen-absorbing alloy, the present invention relates to the nickel electrodes of the alkaline storage batteries and can likewise find an application in the batteries using cadmium, iron or zinc electrodes for the negative electrode.

As described hereinabove, the present invention makes it possible to obtain the positive electrodes for alkaline storage battery having a good conductivity, high stability in the alkaline solutions and long-lived cycle characteristics by mixing the metal nitrides as the conductive material or coating them as the conductive layer or implementing both of them.

What is claimed is:

1. A non-sintered type positive electrode for alkaline storage battery, said electrode including an active material comprising nickel hydroxide as a main component and a metal nitride as a conductive material and conductivity-imparting component, wherein the metal nitride exists as separate particles from the nickel hydroxide.

2. A non-sintered type positive electrode for alkaline storage battery according to claim 1, wherein the metal nitride has a conductivity of 1.0×10 S/cm or more at room temperature.

3. A non-sintered type positive electrode for alkaline storage battery according to claim 1, wherein the metal nitride is at least one selected from the group consisting of transition metal nitride, alkaline metal nitride and alkaline earth metal nitride.

4. A non-sintered type positive electrode for alkaline storage battery according to claim 1, wherein the metal nitride is at least one selected from the group consisting of TiN, ZrN, HfN, VN and NbN.

5. A non-sintered type positive electrode for alkaline storage battery according to claim 1, which contains the metal nitride in an amount of 5 to 20% by weight to the active material of the positive electrode.

6. A non-sintered type positive electrode for alkaline storage battery according to claim 1, wherein the metal nitride is in the shape of particles, having an average particle diameter of 10 $\mu$m or less.

7. A non-sintered type positive electrode for alkaline storage battery, said electrode including an active material comprising composite particles comprising particles comprising nickel hydroxide as a main component and conductive layers which contain metal nitride as a conductivity imparting component and which are formed on at least parts of surfaces of the particles comprising nickel hydroxide, wherein a content of the conductive layers is 5 to 20% by weight based on a weight of the composite particles.

8. A non-sintered type positive electrode for alkaline storage battery according to claim 7, wherein the metal nitride has a conductivity of 1.0×10S/cm or more at room temperature.

9. A non-sintered type positive electrode for alkaline storage battery according to claim 7, wherein the metal nitride is at least one selected from the group consisting of transition metal nitride, alkaline metal nitride and alkaline earth metal nitride.

10. A non-sintered type positive electrode for alkaline storage battery according to claim 7, wherein the metal nitride is at least one selected from the group consisting of TiN, ZrN, HfN, VN and NbN.

11. A non-sintered type positive electrode for alkaline storage battery, said electrode comprising an active material comprising composite particles comprising particles comprising nickel hydroxide as a main component and conductive layers which contain a first metal nitride and a conductivity imparting component and which are formed on at least parts of surfaces of the particles comprising nickel hydroxide and further contains a second metal nitride as a conductive material.

12. A non-sintered type positive electrode for alkaline storage battery according to claim 11, wherein the first and second metal nitrides respectively have a conductivity of 1.0×10S/cm or more at room temperature.

13. A non-sintered type positive electrode for alkaline storage battery according to claim 11, wherein the first and second metal nitrides are respectively at least one selected from the group consisting of transition metal nitride, alkaline metal nitride and alkaline earth metal nitride.

14. A non-sintered type positive electrode for alkaline storage battery according to claim 11, wherein the first and second metal nitrides are respectively at least one selected from the group consisting of TiN, ZrN, HfN, VN and NbN.

15. A non-sintered type positive electrode for alkaline storage battery according to claim 11 wherein the first metal nitride is at least one selected from the group consisting of transition metal nitride, alkaline metal nitride and alkaline earth metal nitride and the second metal nitride is at least a kind selected from the group consisting of TiN, ZrN, HfN, VN and NbN.

16. A non-sintered type positive electrode for alkaline storage battery according to claim 11 wherein the first metal nitride is at least one selected from the group consisting of TiN, ZrN, HfN, VN and NbN and the second metal nitride is at least a kind selected from the group consisting of transition metal nitride, alkaline metal nitride and alkaline earth metal nitride.

17. A non-sintered type positive electrode for alkaline storage battery according to claim 11 which contains the first metal nitride and second metal nitride in a total amount of 5 to 20% by weight to the positive electrode active material comprising nickel hydroxide as the main component.

18. A non-sintered type positive electrode for alkaline storage battery according to claim 11 wherein the second metal nitride is in the shape of particles, having an average particle diameter of 10 μm or less.

19. An alkaline storage battery which comprises a non-sintered type positive electrode for alkaline storage battery according to claim 1.

* * * * *